(12) United States Patent
Yoshida

(10) Patent No.: US 6,626,010 B1
(45) Date of Patent: Sep. 30, 2003

(54) METHOD FOR FLOATING GLASS LUMP, METHOD FOR PREPARING GLASS LUMP AND METHOD FOR PREPARING MOLDED GLASS, AND APPARATUS USED FOR THE METHODS

(75) Inventor: Masahiro Yoshida, Hidaka (JP)

(73) Assignee: Hoya Corporation, Tokyo (JP)

(*) Notice: Subject to any disclaimer, the term of this patent is extended or adjusted under 35 U.S.C. 154(b) by 16 days.

(21) Appl. No.: 09/691,262

(22) Filed: Oct. 19, 2000

(30) Foreign Application Priority Data

Oct. 19, 1999 (JP) ............................................. 11-297460

(51) Int. Cl.$^7$ .............................................. C03B 40/04
(52) U.S. Cl. ............................. 65/25.1; 65/25.3; 65/84; 65/85; 65/127; 65/182.2; 65/182.1; 65/303; 65/304; 65/66; 65/81; 65/83; 65/68; 65/37
(58) Field of Search ................................ 65/25.1, 25.3, 65/84, 85, 127, 182.2, 182.1, 303, 304, 66, 81, 83, 68, 37

(56) References Cited

U.S. PATENT DOCUMENTS

| | | | |
|---|---|---|---|
| 1,727,379 A | * | 9/1929 | Peiler |
| 3,672,860 A | * | 6/1972 | Keller |
| 5,173,100 A | * | 12/1992 | Shigyo et al. |

FOREIGN PATENT DOCUMENTS

JP  2-14839  *  1/1990  ................. 65/304

* cited by examiner

*Primary Examiner*—Michael Colaianni
(74) *Attorney, Agent, or Firm*—Burns, Doane, Swecker & Mathis, L.L.P.

(57) ABSTRACT

A method of floating glass gobs by means of a gas flow. A method of manufacturing glass gobs by floating a molten glass gob and simultaneously cooling it. A method of manufacturing glass spheres by floating a softened glass gob and simultaneously rendering it spherical. These methods employ a device having a depression for floating and holding a glass gob or the like, with a gas flow being supplied along all or part of the inner surface of the depression from the opening side of the depression toward the bottom. A manufacturing method comprising the steps of adjusting a glass gob to a temperature suited to press molding while floating said glass gob by means of a gas flow injected along part or all of the depression-shaped forming surface of a lower mold from the opening side of the lower mold toward the bottom of the lower mold; and a step of press forming the glass gob. A method for floating and manufacturing glass gobs characterized by comprising a depression for floating and holding a glass gob through the action of a gas flow, and a gas flow supply inlet for generating a gas flow for floating a glass gob, running along part or all of the inner surface of said depression from the opening side of said depression to the bottom. A method of floating a glass gob by means of a gas flow and a floating and manufacturing device are provided.

39 Claims, 10 Drawing Sheets

METHOD FOR FLOATING GLASS LUMP, METHOD FOR PREPARING GLASS LUMP AND METHOD FOR PREPARING MOLDED GLASS, AND APPARATUS USED FOR THE METHODS

TECHNICAL FIELD

The present invention relates to a method of floating glass gobs, a method of manufacturing glass gobs, a method of manufacturing molded glass, and the devices employed in these methods.

BACKGROUND ART

In recent years, high-precision hot press molding techniques based on forming molds have been successfully developed as methods of manufacturing aspheric glass lenses and the like. The weight of the prepared member (referred to hereinafter as a "preform") used in molding must be precise down to the milligram, and the presence of flaws such as striae, devitrification, scratches, and bubbles, as well as surface-adhering matter that cannot be washed away, is not permissible.

For example, a method of mass producing such preforms at low cost is described in Japanese Patent Application Publication No. Hei 2-14839. In that method, molten glass flowing out of a pipe is received in a depression in a forming mold. In this process, a gas such as air or an inert gas is injected through fine holes formed in the depression, creating a layer of gas between the molten glass gob and the inner surface of the depression in the forming mold. Until at least a portion of the outer surface of the molten glass gob reaches a temperature below the softening point, the molten glass gob is held within the depression in a state of substantial non-contact with the inner surface of the depression and cooled to manufacture glass gobs. Based on that method, since both the upper and lower surfaces are free surfaces, preforms of good surface quality can be obtained. Further, in that method, since the molten glass is allowed to drip naturally or is cut with a cutting blade to make it drop, a practical level of weight precision can also be achieved.

Japanese Patent Application Publication Nos. Hei 6-122526, Hei 6-144845, and Hei 6-206730 disclose methods in which a receiving mold comprised of a porous material is employed instead of the above-described forming mold with fine holes, molten glass is received with gas being injected through the receiving mold, and molten glass gobs are similarly held within a depression in a non-contact state and cooled to obtain glass gobs. Further, Japanese Patent Application Publication No. Hei 11-116252 discloses a method in which molten glass is received while gas is being injected through a receiving mold of a porous material having a hemispherical depression and the molten glass gob is rotated in a state of non-contact and cooled to obtain glass spheres. Additionally, Japanese Patent Application Publication No. Hei 10-139465 discloses a method in which molten glass is received in a receiving mold made of porous material that has been soaked in water, a liquid organic compound, or the like and the molten glass is floated by means of gas vaporization pressure and cooled to obtain glass gobs.

However, the above-cited prior art has the following drawbacks. In the method described in Japanese Patent Application Publication No. Hei 2-14839, gas is injected through fine holes in a mold with a depression to float molten glass. In this floating method, when the gas flow rate is increased to completely float the molten glass, pits similar to those on an orange-skin form in the molten glass surface. Since this pitting is formed in the glass by the pressure of gas injected through fine holes, it is necessary to decrease the gas flow rate to a degree where surface pits do not form. However, when the gas flow rate is lowered, it becomes impossible to completely prevent temporary contact between the forming mold and the glass, particularly at the initial stage of glass outflow. Accordingly, the depression surface in this method is machined to a mirror finish to prevent scratching of, and adhesion of dirt onto, the glass surface due to temporary contact.

There is also glass from which preforms of good quality cannot be manufactured by the above-described method. For example, when forming glass in which component volatility is high in the flow temperature range, vapor tends to condense and deposit on the forming mold, which is set to a low temperature. Volatile components that have deposited on the mold then re-adhere to the glass surface through contact between mold and glass. Glasses with high component volatility are glasses containing large amounts of components with high vapor pressures at high temperature, examples of which are alkali components such as $Na_2O$, $K_2O$, and $Li_2O$, as well as $B_2O_3$; glasses with high liquidus temperatures; glasses with high viscosities at high temperature; and glasses with high outflow temperatures. Since common glasses contain alkali components, problems tend to occur with volatile matter in glasses with a liquidus temperature of 900° C. or above.

Further, even if contact with the mold is prevented, the small amount of floating above the mold increases the concentration of volatile components between the mold and the glass, and the volatile components tend to adhere to the glass. Further, when molding glasses that tend to crystallize (devitrify) near the outflow temperature, contact between the mold and the glass immediately after outflow triggers crystallization and the glass surface sometimes crystallizes. As set forth above, the forming of glass with a large amount of volatile matter in the outflow temperature range and glass tending to crystallize requires that there be absolutely no contact between mold and glass.

Further, the forming of glass with a large amount of volatile matter in the outflow temperature range requires that the gas flow rate be increased to lower the concentration of volatile matter in the gap between the mold and the molten glass and to expel volatile matter from the gap.

A more complete floating state can be achieved by employing a receiving mold comprised of a porous member and rendering uniform the flow of gas that is injected as described in Japanese Patent Application Publication No. Hei 6-122526. However, in practice, the following problems result from the porous member. For example, achieving uniform gas injection requires the selection of a porous member of small pore diameter. However, when a porous member with a small pore diameter is employed, an extremely high gas pressure is required to achieve a gas flow rate adequate for floating, which is a drawback in that the device becomes expensive. Further, when a porous member is employed, there is a drawback in that gas permeability differs substantially between individual molds and the gas flow rate must be substantially adjusted for each forming mold. Although there are various differences, there is a distribution in the gas permeability within a single porous member, making it difficult to achieve a stable floating state. The porous material can be a carbon or ceramic porous material, but these tend to present such problems as low material strength, damage to the porous member during mold assembly, falling off of the surface of the porous member during forming due to thermal shock, and adhesion of fragments to the molten glass surface. Porous members comprised of heat-resistant metals have few of the above-stated problems relating to material strength. However, due to the toughness of the material, the surface pores tend to be crushed during mold processing, often making it impossible to uniformly inject gas.

As set forth above, although a porous member is employed to achieve uniform gas for floating, it is difficult to achieve the intended ideal floating state. There is a further drawback in that mistakes such as forgetting to turn on the gas flow in the mold that result in contact between the mold and the glass tend to damage the mold.

There are additional drawbacks in that porous materials are expensive to buy and to process, and when volatile components have adhered to them, regeneration by washing and grinding is not effective.

The method of floating molten glass by means of the gas vaporization pressure of water or the like in a porous material described in Japanese Patent Application Publication No. Hei 10-139465 has the following problems. To prevent the liquid from evaporating before the molten glass is received in the mold, the temperature of the porous mold must be maintained at below the boiling point of the liquid. Thus, the surface temperature of the molten glass tends to drop precipitously, and when molding large glass gobs, the potential for cracking is high.

Further, in methods employing a mold having pores and in methods in which a porous member is employed as the receiving dish, minute holes must be imparted to the receiving dish, the structure is complicated, and manufacturing costs are thus high. There are further drawbacks in that washing is difficult, the holes become clogged with both grime and volatile matter from the glass, the holes tend to crush, and the service life of the mold is short.

Further, there is a drawback in the prior art methods in that since gas is directly injected at high pressure through fine holes present in the inner wall of a depression or through the holes of a porous member, the portion of the glass gob that is directly struck by the gas always tends to be deformed.

There is a further drawback in the prior art methods, in that when molten glass drops of adequate size first enter the depression, a layered airflow develops between the inner walls of the depression and the glass gob and a floating force is achieved; however, until the molten glass drops reach adequate size, the initial floating state is unstable and contact with the depression tends to occur. There is also a problem in that when the glass gobs are quite small relative to the size of the depression, the gas flow escapes around the glass gob to the top and the floating force is not exerted properly. It is thus necessary to design a floating device corresponding in size to that of the glass gobs.

One object of the present invention is to provide a method of floating glass gobs that solves the above-stated problems and is capable of maintaining a state of non-contact between the glass gob and the depression for keeping the glass gob floating, irrespective of the size of the glass gob.

A further object of the present invention is to provide a method of readily manufacturing glass gobs or spherical glass gobs with good surface quality by maintaining a good state of non-contact between the glass gob and the depression for keeping the glass gob floating, irrespective of the size of the glass gob, even from glass containing numerous components that volatize in the outflow temperature range and from glass with a strong tendency to crystallize.

A still further object of the present invention is to provide a method of manufacturing molded glass by manufacturing glass gobs with good surface quality by maintaining a good state of non-contact between the glass gob and the depression for keeping the glass gob floating, irrespective of the size of the glass gob, even from glass containing numerous components that volatize in the outflow temperature range and from glass with a strong tendency to crystallize, and efficiently molding the glass gobs thus manufactured.

SUMMARY OF THE INVENTION

The present invention is configured as follows to achieve the above-stated objects:

A method of floating glass gobs by means of a gas flow employing a device comprising a depression for floating and holding a glass gob, characterized in that said gas flow runs along part or all of the inner surface of said depression from the opening side of said depression toward the bottom of said depression (referred to hereinafter as Method 1).

In Method 1, a gas flow is supplied from a gas flow inlet positioned at the opening end of said depression or on the inner wall between said opening end and the bottom. Examples of the glass gobs that are floated are molten glass gobs and softened glass gobs.

The present invention (a further mode) is configured as follows to achieve the above-stated objects:

A method of manufacturing glass gobs employing a device comprising a depression for holding a molten glass gob by floating and cooling said molten glass gob while floating said molten glass gob by means of a gas flow, characterized in that said gas flow runs along part or all of the inner surface of said depression from the opening side of said depression toward the bottom of said depression (referred to hereinafter as Method 2).

In Method 2, the molten gas gob is obtained by making molten glass flow out of a molten glass outflow nozzle, floating it above a depression by means of the gas flow, and forming it. Further, in this manufacturing method, the molten gas flowing out of the molten glass outflow nozzle can be received by a glass receiving member positioned on the outer portion of said depression, the molten glass received on the glass receiving member can be cut off from the outflow nozzle to form a molten glass gob, and the molten glass gob can then be guided into the depression. In this method, the glass receiving member can be positioned adjacent to the opening in the depression on the device having a depression. Further, the cutting of the molten glass from the outflow nozzle can be conducted by moving the glass receiving member downward or by moving the molten glass outflow nozzle upward. Further, in Method 2, the molten glass gob can be rendered spherical while being floated.

The present invention (a further mode) is configured as follows to achieve the above-stated objects:

A method of manufacturing spherical glass gobs employing a device comprising a depression for floating and holding a molten glass gob to float and simultaneously render spherical by a gas flow a glass gob that has been softened, characterized in that said gas flow runs along part or all of the inner surface of said depression from the opening side of said depression toward the bottom of said depression (referred to hereinafter as Method 3).

The present invention (a further mode) is configured as follows to achieve the above-stated objects:

A method of manufacturing molded glass characterized in that a glass gob obtained by above-described Method 2 is press molded with an upper mold and a lower mold having opposing forming surfaces (referred to hereinafter as Method 4).

A glass gob with a viscosity of $10^2$–$10^{10}$ poise can be press molded by Method 4.

The present invention (a further mode) is configured as follows to achieve the above-stated objects:

A method of manufacturing molded glass characterized in that a glass gob obtained by above-described Method 3 is press molded with an upper mold and a lower mold having opposing forming surfaces (referred to hereinafter as Method 5).

A glass gob with a viscosity of $10^2$–$10^{10}$ poise can be press molded by Method 5.

The present invention (a further mode) is configured as follows to achieve the above-stated objects:

A method of manufacturing molded glass by press molding softened glass gobs with an upper mold and a lower mold having opposing forming surfaces, characterized by comprising a step of adjusting a glass gob to a temperature suited to press molding while floating said glass gob by means of a gas flow running along part or all of the depression-shaped forming surface of said lower mold from the opening side of said lower mold toward the bottom of said lower mold; and a step of press forming said glass gob (referred to hereinafter as Method 6).

A glass gob with a viscosity of $10^2$–$10^{10}$ poise can be press molded by Method 6.

Further, the gas flow in above-described methods 2–6 can be supplied by a gas flow inlet positioned at the opening end of said lower mold or on the inner wall between said opening end and the bottom, and the liquidus temperature of said glass comprising said glass gob can be 900° C. or greater.

The present invention (a further mode) is configured as follows to achieve the above-stated objects:

A device for floating and manufacturing a glass gob characterized by comprising a depression for floating and holding a glass gob through the action of a gas flow, and a gas flow supply inlet for generating a gas flow for floating a glass gob, running along part or all of the inner surface of said depression from the opening side of said depression to the bottom (referred to hereinafter as Device 1).

In above-described Device 1, the gas flow supply inlet can be positioned on the opening end of said depression or on the inner surface between the opening end and the bottom. Further, the glass gob can be a molten glass gob or softened glass and the inner surface of the depression can be the forming surface of a press forming mold.

Also, a glass gob manufacturing device characterized by comprising a depression for floating and holding a molten glass gob through the action of a gas flow; a gas flow supply inlet for generating a gas flow for floating a glass gob, running along part or all of the inner surface of said depression from the opening side of said depression to the bottom; and a glass receiving member upon which molten glass from a molten glass outflow nozzle is mounted as the molten glass gob, for introducing said molten glass into said depression, positioned adjacent to said opening of said depression (referred to hereinafter as Device 2).

In Device 2, the gas flow supply inlet can be positioned on the opening end of said depression or on the inner surface between the opening end and the bottom. Further, the inner surface of the depression can be the forming surface of a press forming mold.

BEST MODE OF IMPLEMENTING THE INVENTION

Figure 1:
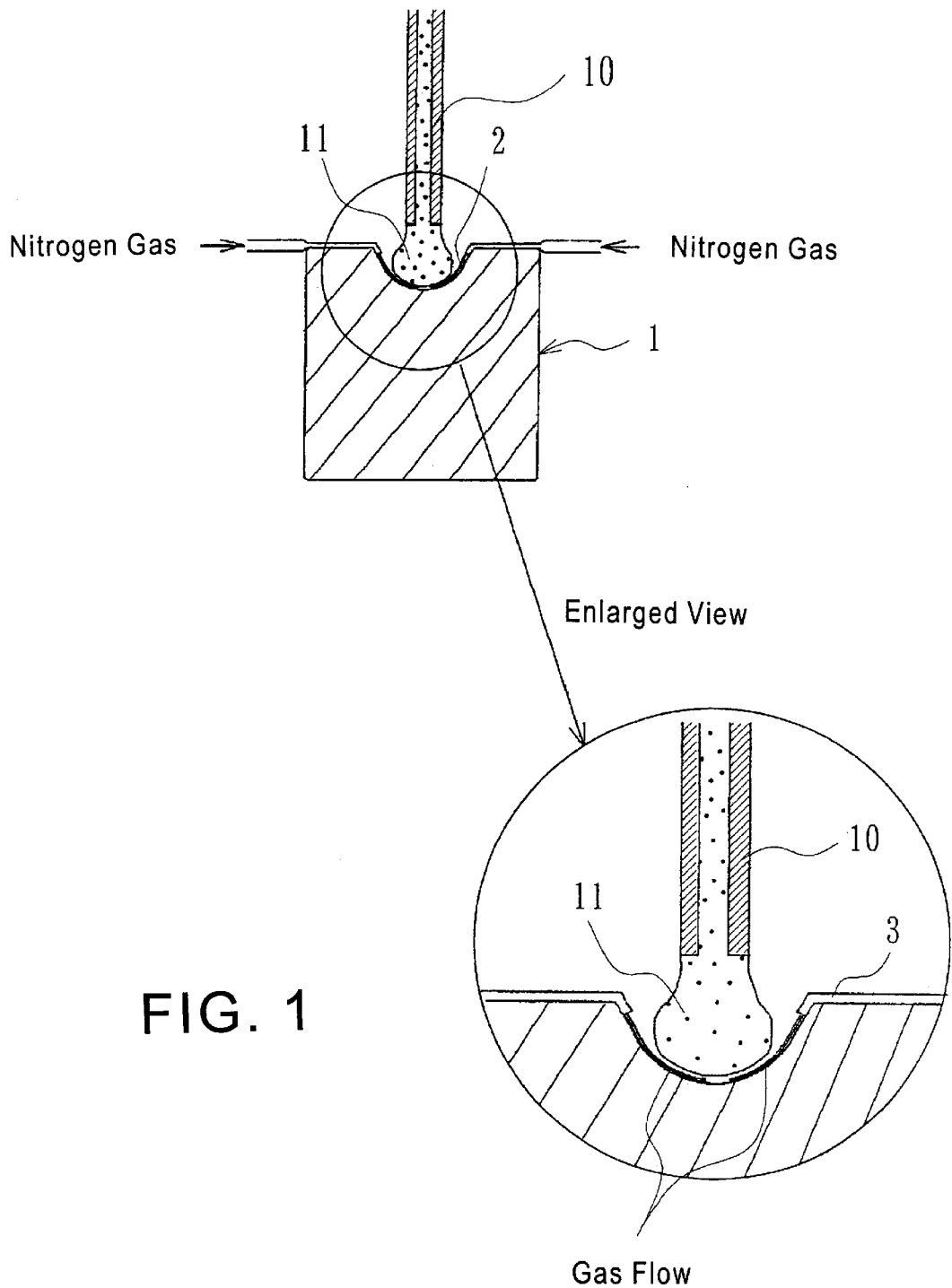
FIG. 1 is a schematic view of the device for floating or manufacturing a glass gob of the present invention.

In the method of floating glass gobs, method of manufacturing glass gobs or spherical glass gobs, and method of manufacturing molded glass of the present invention, a glass gob is floated by means of a device having a depression for floating and holding a glass gob above it.

In the present invention, the term lass gob refers to glass that has been formed into a gob shape, including molten glass gobs, softened glass gobs, and solid glass gobs. Glass also includes crystallized glass. These glass gobs may be at ordinary temperature or in a heated state. However, the methods of the present invention are optimal for glass gobs developing viscosity or tending to deform when in a heated state. The methods of the present invention may also be applied to gobs comprised of polymers other than glass.

The method of floating glass gobs of the present invention can be employed in the manufacturing, molding, processing, and transporting of these glass gobs. For example, a glass gob can be held, heated, cooled, and the like while being floated. The method of manufacturing glass gobs and the method of molding glass of the present invention employ the above-described method of the present invention. For example, when the glass gob is a molten glass gob, glass gobs can be manufactured by cooling a molten glass gob while it is being floated. Molten glass gobs may also be obtained from molten glass flowing out of an outflow nozzle. Further, the method of the present invention may be used to heat and soften glass gobs, which are then press molded to obtain molded glass. Further, the glass gobs obtained by the methods of the present invention can be employed as preforms for press molding.

In the methods of the present invention, the above-described glass can be optical glass employed in the molding of common lenses and the like. Further, this glass may be a glass with a high liquidus temperature, a glass tending to crystallize, and the like, that is processed with difficulty by prior art. The viscosity of the glass flowing out of a molten glass outflow nozzle is about 10–50 poise. Such molten glass can be cooled while being floated on the above-described depression and then removed after reaching a temperature at which it will not deform (a temperature below Tg, at which the viscosity is $10^{13}$ poise or greater). Further, when forming softened glass by floating, forming is not possible when the glass viscosity is excessively high. When the glass viscosity decreases, infolding and other phenomena occur. Thus, a glass viscosity of about $10^2$–$10^3$ poise is preferred for forming glass while it is being floated.

The gas employed to generate a gas flow in the present invention is preferably an inert gas such as nitrogen or air. The gas may be at ordinary temperature, or heated to a prescribed temperature. For example, when the glass gob is being cooled, the gas can be employed at ordinary temperature. Conversely, when adjusting a glass gob that is at ordinary temperature or a preheated glass gob to a prescribed temperature, heated gas can be employed.

In the method of floating glass gobs, method of manufacturing glass gobs or spherical glass gobs, and method of manufacturing molded glass of the present invention, the gas is supplied along part or all of the inner surface of the depression from the side of the opening of the depression toward the bottom. Specifically, the gas flow is supplied from a gas flow supply inlet positioned on the opening end of the depression toward the bottom of the inside surface, or from a gas flow supply inlet positioned on the inner surface (part way) between the opening end and bottom toward the bottom of the inside surface. Gas that is supplied toward the bottom of the depression is preferably supplied as a layer along the inside surface of the depression so as to stably float the glass gob. Gas can be supplied from a portion of the inside surface of the depression, or from the entire inside surface of the depression. This will be described in detail in the description of the devices.

The gas flow referred to in the present invention is the flow of a gas. This gas flow is present between the inside surface of the depression and the glass gob, functioning as a cushion so that the glass gob is floated and held without contacting the depression. When rendering the glass gob spherical, the glass gob is rotated by the gas flow. For example, in the method of the present invention, a gas is supplied from part or all of the vicinity of the opening of the depression toward the bottom along the inner surface of the depression and a gas flow is generated. Thus, the gas flow does not directly strike the glass gob, thus avoiding the generation of irregularities in the glass gob due to the gas flow. Although described again further below, the balance of gas supplied around the depression can be purposely disrupted to introduce gas flowing in a specific direction beneath the glass gob, facilitating glass gob rotation.

In the method of manufacturing glass gobs of the present invention, a molten glass gob is cooled with a gas flow while being floated and held. Here, the molten glass gob can be obtained from molten glass flowing out of a molten glass outflow nozzle that is formed while being maintained above the depression in a state of non-contact with the device by means of a gas flow. The molten glass gob can be formed, as shown in FIG. 1, by holding by means of a gas flow molten glass flowing out of a molten glass outflow nozzle, then either moving the device downward or moving the molten glass outflow nozzle upward to sever the outflowing molten glass. In this manner, the molten glass can be formed into gobs while in a state of non-contact and the weight of the glass gobs can be rendered uniform.

More specifically, a gas current is generated from the opening side of the depression along the inner surface of the depression toward the bottom and the molten glass is floated. At this time, the layer of gas flow striking the bottom of the depression generates an upward gas flow. First, the downward flowing molten glass drops while being subjected to the lifting force of the upward gas flow, and after dropping, is held in a state of non-contact with the mold by the gas flow on the inside surface of the depression. It is possible to stably maintain a state of non-contact with the mold by substantially increasing the flow velocity of the gas flow. Further, since the upward gas flow is an upward flow that has been disordered by impact with gas, defects such as pitting are not produced on the molten glass surface even when the gas flow velocity is increased. Next, either the device is moved downward, or the molten glass outflow nozzle is moved upward to sever the outflowing molten glass, yielding a glass gob. This glass gob is then cooled while being maintained in a state of non-contact with the mold to obtain a [finished] glass gob.

In addition to using the above-described method to manufacture molten glass gobs by causing molten glass to flow out of a molten glass outflow nozzle, molten glass flowing out of a molten glass outflow nozzle can be received in a glass receiving member, and at the point in time where the molten glass being received in the glass receiving member reaches a desired weight, the molten glass can be severed from the molten glass outflow nozzle, yielding molten glass of desired weight in the glass receiving member. Next, the molten glass can be introduced into the depression from the receiving member. Receiving the molten glass in the glass receiving member makes it possible to obtain molten glass of desired weight with good precision.

The means of severing the molten glass from the outflow nozzle can be either to move the outflow nozzle upward or to move the glass receiving member downward. When the glass receiving member is integrally configured with the device having a depression, the device can be moved downward. The glass receiving member need only be able to receive the molten glass flowing out of the molten glass outflow nozzle and collect enough to reach a desired weight. For example, a sheetlike member, bowl-shaped member, or the like can be employed. Further, once the molten glass has dripped or been severed from the outflow nozzle yielding a molten glass gob, it can also be received by a glass receiving member provided outside the depression.

Further, the glass receiving member is preferably positioned adjacent to the opening of the depression. For example, as shown in FIG. 11, the glass receiving member is desirably integrally formed with a surface sloping in a direction causing molten glass 23 to fall toward depression 20 around the depression opening 21 side of a device having a depression 20. Specifically, as shown in FIG. 11, glass receiving member 22 can be a surface having a slope running downward toward depression 20 that is formed on the upper surface of a member having on its inside a protrusion 25 for forming the gas flow supply inlets and covering a portion of the perimeter of depression 20. The surface having a slope may also be a curved surface.

However, when molten glass 23 remains too long in receiving member 22, a comparatively high viscosity portion is generated in part of the molten glass surface and the shape of the glass gob that is manufactured becomes distorted, making it difficult to form spheres. Accordingly, the angle, curvature, or the like of the slope provided in the glass receiving member is desirably adjusted so that molten glass gob is introduced into depression 20 almost simultaneously with the severing of molten glass 23 from outflow nozzle 24. It is preferable that the molten glass gob be introduced naturally into the depression by means of its own weight.

In such a configuration, a molten glass gob received by the receiving member can be automatically introduced into the depression without employing a complex device. The structure and disposition of the glass receiving member are preferably such that the retention time of the glass in the glass receiving member is 5 seconds or less. Thus, the glass receiving member is preferably positioned in proximity to, or adjacent to, the depression opening. Here, in proximity to the depression opening means that the molten glass gob is introduced into the depression within 5 seconds of the glass flow contacting the glass receiving member. When the glass receiving member is in proximity to, but not adjacent to, the depression opening, a passage having a slope of a degree capable of naturally moving the molten glass gob from the receiving member to the depression opening is preferably provided between the glass receiving member and the depression opening. In that case, the length and slope of the passage are considered so that the time from when the glass flow contacts the glass receiving member to when the molten glass gob is introduced into the depression is 5 seconds or less.

However, when the receiving member sloping downward toward a depression in proximity with or adjacent to the depression opening of the device having a depression has an excessively steep slope, there is a risk that the outflowing molten glass will not collect in the glass receiving member and will end up flowing toward the depression or becoming something resembling a stream. Since the weight of the glass gob tends to change in such cases, it is desirable to suitably adjust the shape of the glass receiving member or the position of the molten glass.

Further, once the molten glass flow has contacted the glass receiving member, the molten glass can be made to flow onto the glass receiving member and mounted thereon while widening the distance between the outflow nozzle and the receiving member, thereby controlling the outflow of the molten glass toward the depression from the glass receiving member. For example, this can be accomplished by moving the outflow nozzle upward or by moving the receiving member downward at a rate that will not sever the molten glass flow during the outflow of molten glass. This method is desirable from the perspectives of reducing the area of contact with the receiving member and preventing the molten glass from flattening while being retained (which is particularly advantageous when forming spheres). In that case, when molten glass of the desired weight has been obtained, the molten glass flow is cut at the outflow nozzle, permitting the forming of molten glass gobs. The molten glass flow is cut, for example, by moving the outflow nozzle upward, or by moving the receiving member downward, at a rate that is adequate to sever the molten glass.

Figure 5A:
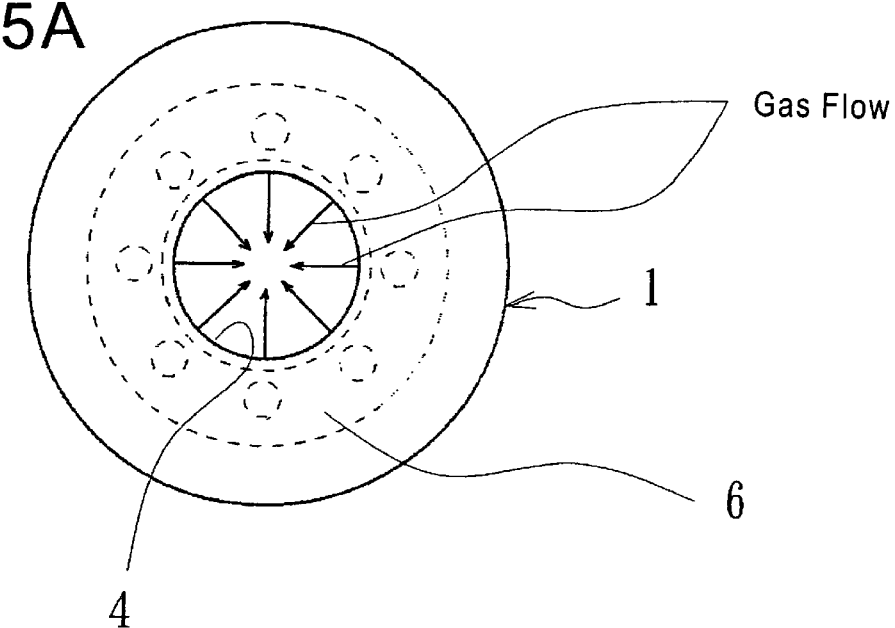
FIG. 5 is a schematic view of the device for floating or manufacturing a glass gob of the present invention.
Figure 12:
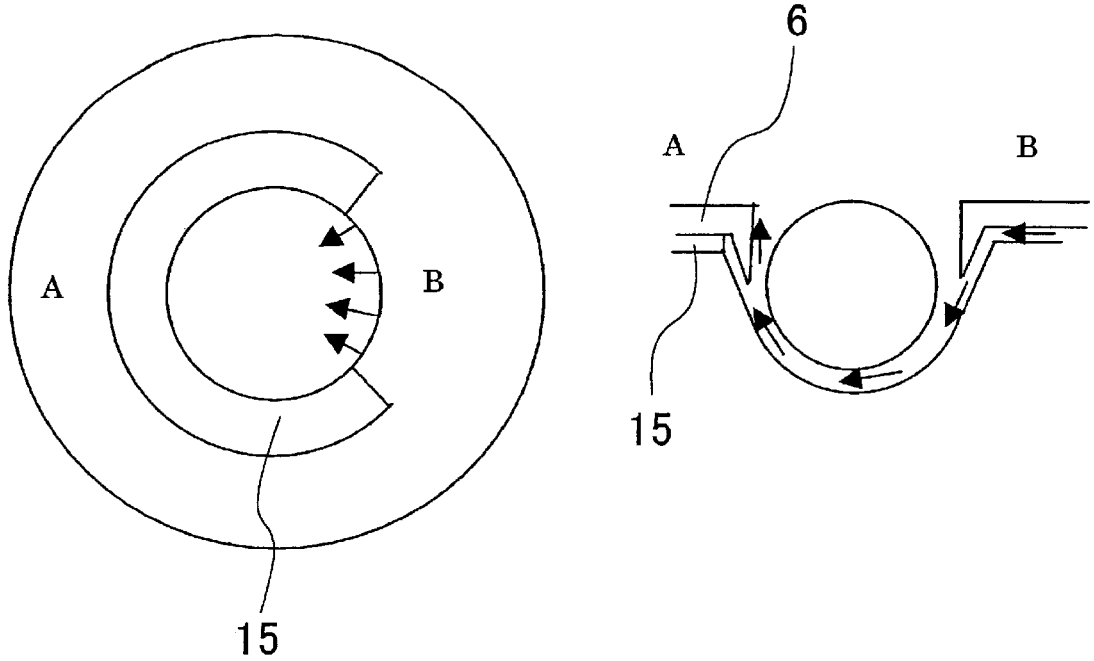
FIG. 12 is a schematic view of the device for floating or manufacturing a glass gob of the present invention.

In the method of the present invention, the molten glass gob can be imparted with a desired shape, such as a spherical shape, during floating. A spherical shape can be imparted to the molten glass gob, as shown in FIG. 5, by injecting the gas at a certain angle from the center of the depression to turn (rotate) the glass gob. The injection rate (velocity) and injection angle of the gas flow can be varied based on the viscosity of the molten glass gob to suitably vary the time required for forming a sphere. Alternatively, as shown in FIG. 12, described further below, a platelike member 15 in the form of a ring with one portion cut away can be inserted between member 6 and the perimeter of the depression of the member having a depression and gas can be injected from only the perimeter of the depression corresponding to the cutaway portion of the ring to shape the molten glass gob into a sphere. In that case, the glass gob in the depression floats stably and somewhat closer to the portion denoted by A in the figure and a gas flow moving from B towards A along the inner surface of the mold passes under the bottom of the glass gob, causing it to stably rotate. A spherical glass gob can be readily, and is desirably, positioned in the center of the forming surface of the lower mold when molding a lens with a forming mold.

In addition to molten glass gobs, the present invention can be used to form spheres from glass gobs at ordinary temperature (preforms, for example) that are reheated and softened. In that case, a glass gob at ordinary temperature can be heated and softened while being floated or a preheated and softened glass gob can be supplied to the device, and the softened glass gob can be formed into a sphere while being floated. For example, as set forth above, the gas can be injected in a direction at a certain angle relative to the center of the depression to turn (rotate) the glass gob and form a sphere. The injection rate (velocity) and injection angle of the gas flow can be varied based on the viscosity of the molten glass gob to suitably vary the time required for forming a sphere. The glass gob is floated, shaped into a sphere, and cooled, at which time the glass gob can be removed. Alternatively, the glass gob can be sent to the pressing step without cooling.

The device (of the present invention) for floating or manufacturing glass gobs, characterized by comprising a depression for floating and holding a glass gob through the action of a gas flow, and a gas flow supply inlet for generating a gas flow for floating a glass gob by supplying a gas running along part or all of the inner surface of said depression from the opening side of said depression to the bottom, can be employed to float glass gobs.

The floating or manufacturing device of the present invention can be employed as the device having a depression for floating and holding a glass gob in the method and manufacturing method of the present invention. The floating or manufacturing device of the present invention will be schematically described below. In the description given below, the floating or manufacturing device is referred to simply as a floating device.

Figure 2:
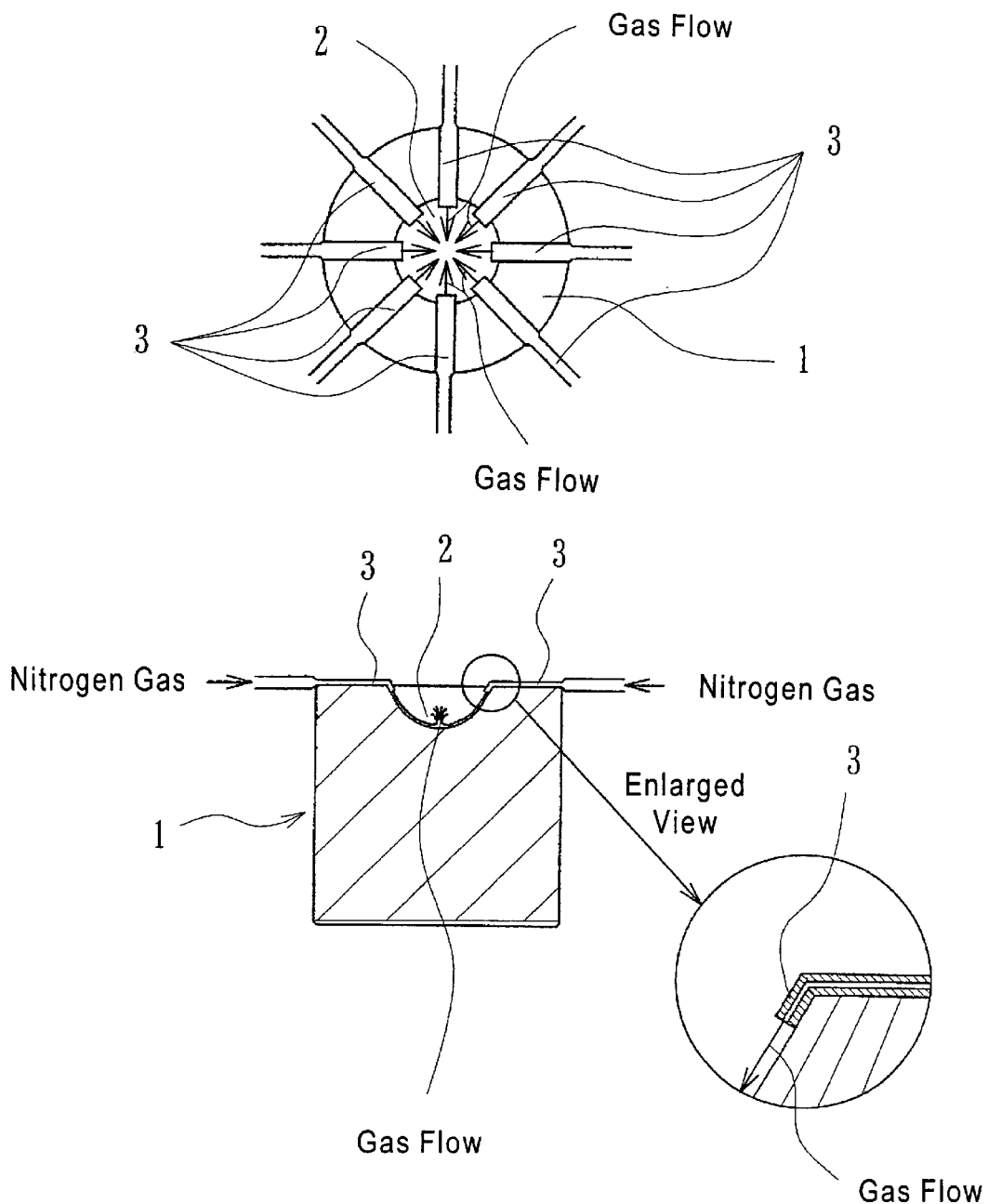
FIG. 2 is a schematic view of the device for floating or manufacturing a glass gob of the present invention.

FIG. 1 is a sectional view of Floating Device 1 of the present invention and a partial enlargement of the same (lower right). The upper portion of FIG. 2 is a plan view of Floating Device 1 of the present invention, and the lower portion is a sectional view of Floating Device 1 and a partial enlargement thereof (lower right). Floating Device 1 of the present invention shown in FIGS. 1 and 2 has a depression 2 for floating and holding a glass gob through the action of a gas flow, and a gas flow supply inlet 3 positioned in proximity to the opening of depression 2 and supplying a gas flow toward the bottom of depression 2 to generate a gas flow for floating a glass gob. Feeding a gas through gas flow supply inlet 3 toward the bottom of the depression generates a layered gas flow along the inside surface of depression 2. The presence of a layer of gas flow between depression 2 and the glass gob from the depression opening side toward the bottom of the depression maintains the glass gob in a state of non-contact with the depression. The presence of a gas flow between the inner surface of the depression and the glass gob maintains a stable floating state in the initial period immediately following placement of the glass gob in the depression and for glass gobs that are quite small relative to the depression.

As shown in FIG. 2, the layered gas currents collecting at the bottom of the depression collide together, generating an upward gas flow. The upward gas flow contributes to floating the glass gob and increases the floating level. Since the upward gas flow is an upward flow that has been disordered by impact with gas, the glass gob tends not to form defects such as pitting and depressions even when the gas velocity is increased. Since the method and device of the present invention do not require directly injecting gas toward the glass gob, defects such as pitting and depressions tend not to form in easily deformed materials such as glass gobs.

Further, since the gas flow is directed toward the bottom of the depression from the depression opening in the method of manufacturing glass gobs and the like of the present invention, pitting and depressions are not formed in the glass gob and the floating level of the glass gob and the flow rate of the gas can be increased. Thus, a good state of non-contact can be maintained, volatile matter generated by the molten glass gob or softened glass gob does not remain between the depression and the glass gob, and volatile matter adhering to the mold does not re-adhere. As a result, good quality glass gobs can be readily manufactured from even glass materials with high liquidus temperatures; glasses having a strong tendency to crystallize; and glass materials with components volatizing in large amounts in the outflow temperature range, which are difficult process with prior art, for example.

Figure 3:
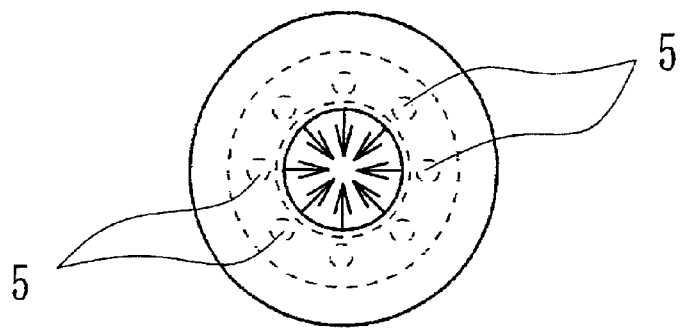
FIG. 3 is a schematic view of the device for floating or manufacturing a glass gob of the present invention.
Figure 3:
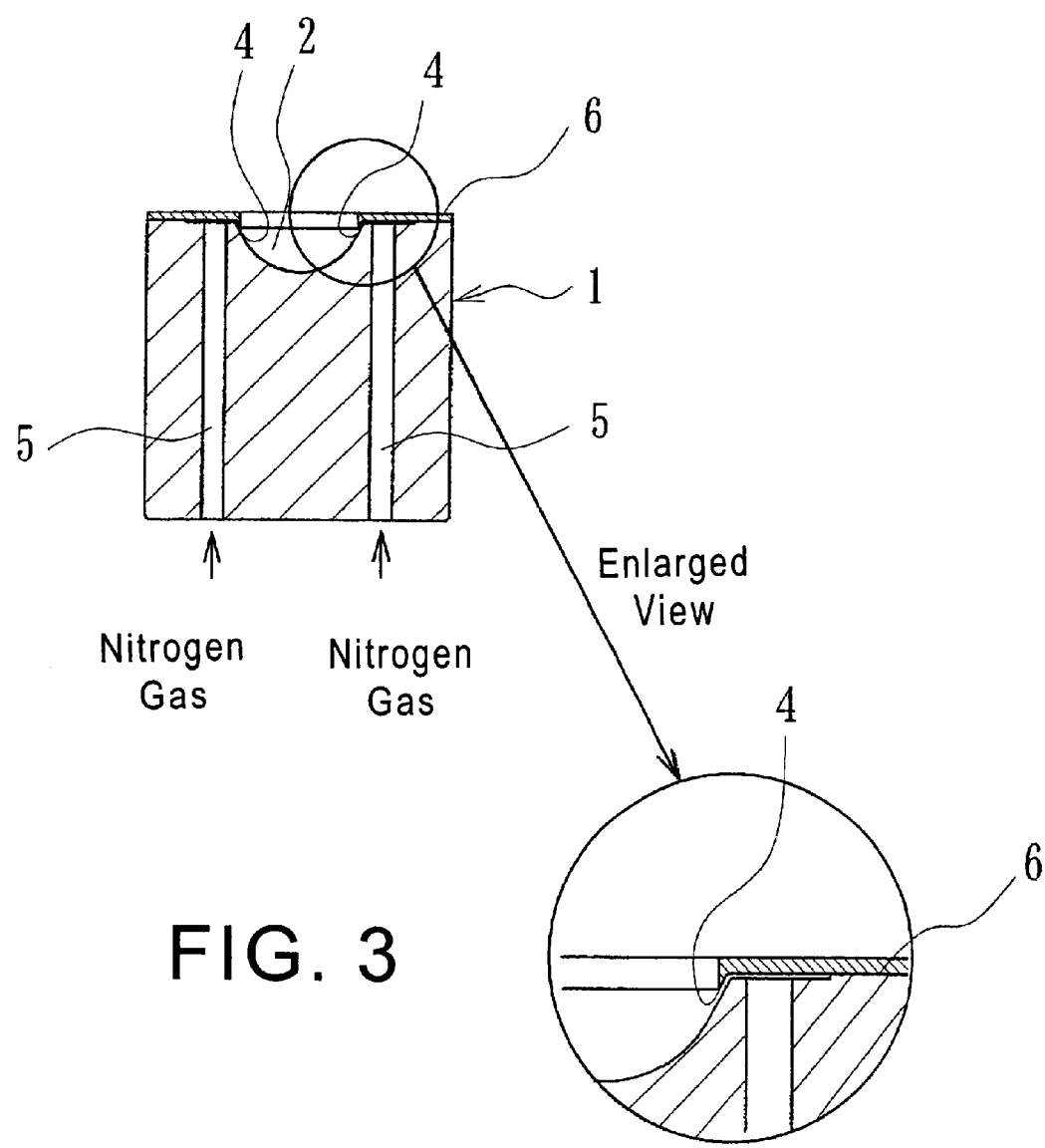
Figure 4:
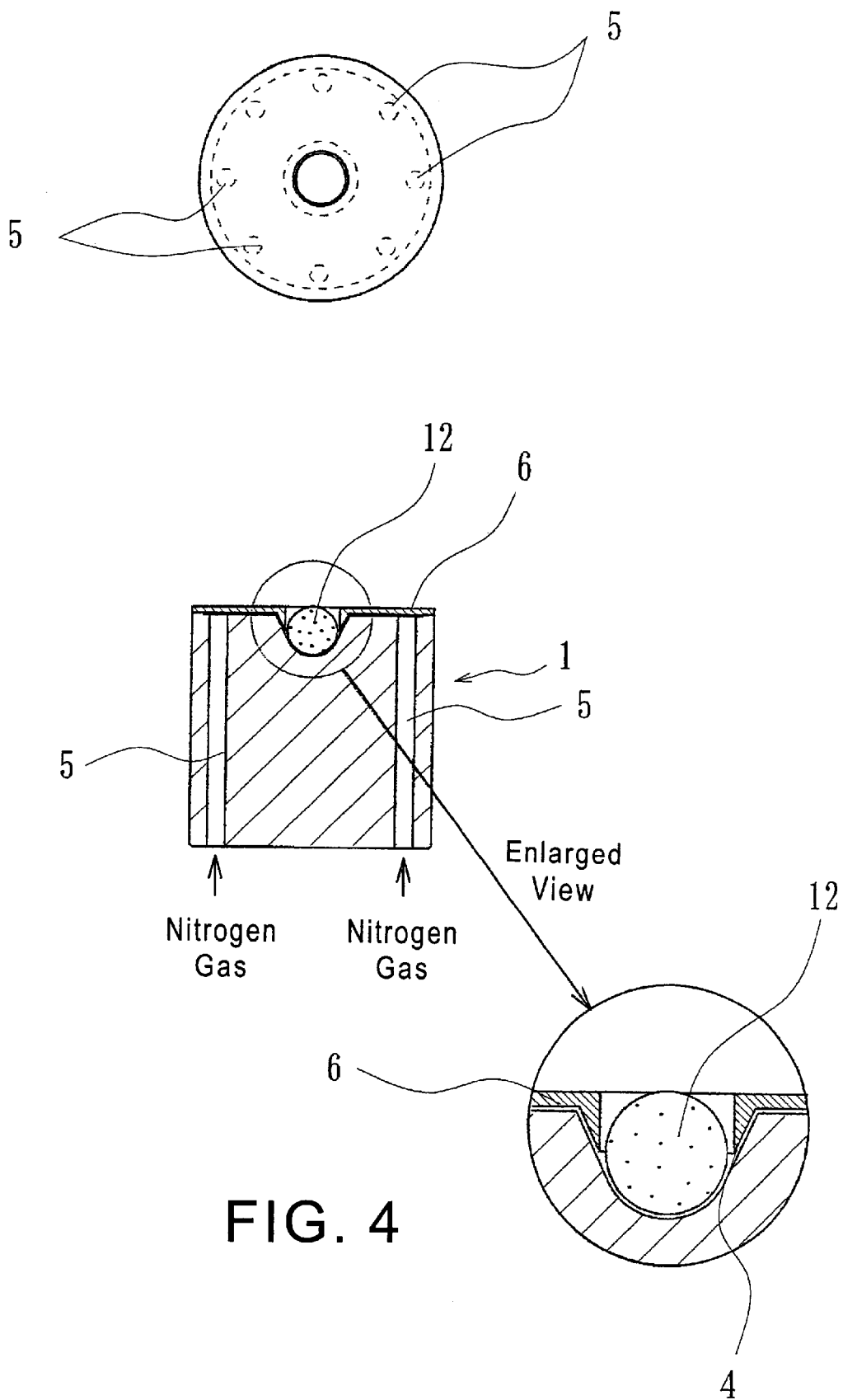
FIG. 4 is a schematic view of the device for floating or manufacturing a glass gob of the present invention.

The upper portions of FIGS. 3 and 4 are plan views of Floating Device 1 of the present invention and the lower portions are sectional views of Floating Device 1 of the present invention and partial enlargements of the same (lower right). As shown in FIG. 3, a gas flow from the opening of the depression toward the bottom is generated by disposing a means of supplying a gas such as gas injection inlet openings 4, capable of injecting a gas in a film (layer) form, in proximity to the depression opening and injecting a gas downward along the inner surface 2 of the forming mold. In this case, a layered gas flow is formed along the inside surface of the depression. The gas supply means, as shown in FIG. 2, can be configured as gas injection inlets arranged in a straight line; as multiple gas supply means arranged in a broken line; or as dots arranged on a line to inject gas in a substantially layerlike (filmlike) manner. As shown in FIGS. 3 and 4, the method of injecting a gas in which the front ends of the gas supply means are arranged in a ring and gas is injected completely around the perimeter of the inner surface of the depression from slit-shaped injection inlets 4 is preferred.

As shown in FIG. 4, positioning injection inlet 4 in a manner protruding into the inner surface of the depression permits the reliable submerging of the gas flow to the bottom of the depression, permitting the reliable bloating of glass gob 12.

Figure 6:
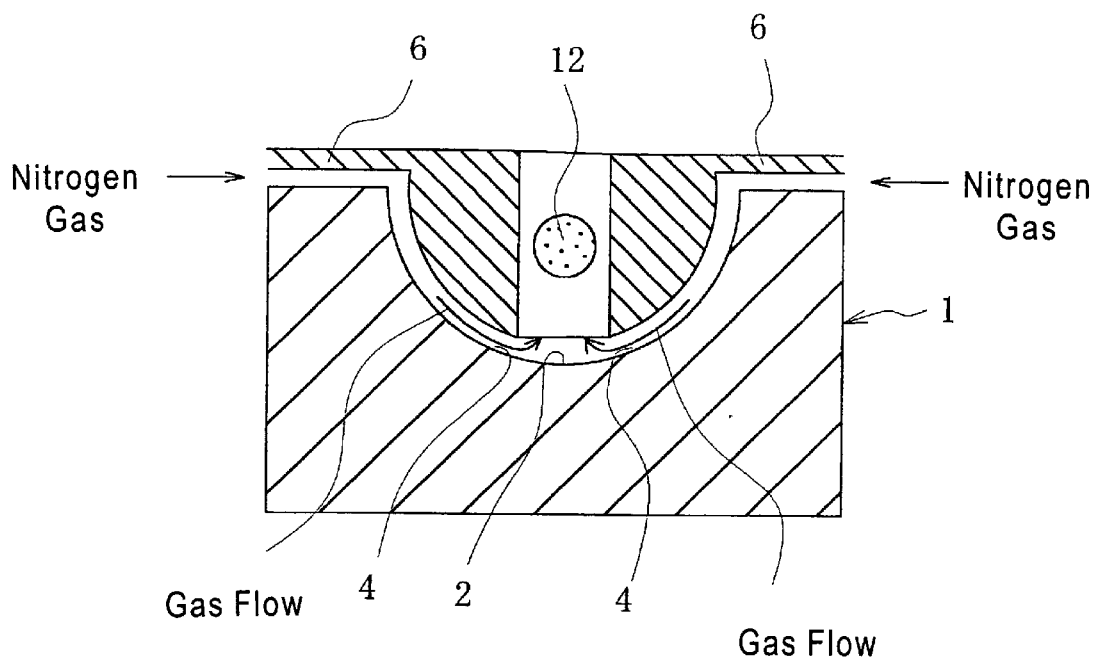
FIG. 6 is a schematic view of the device for floating or manufacturing a glass gob of the present invention.
Figure 7:
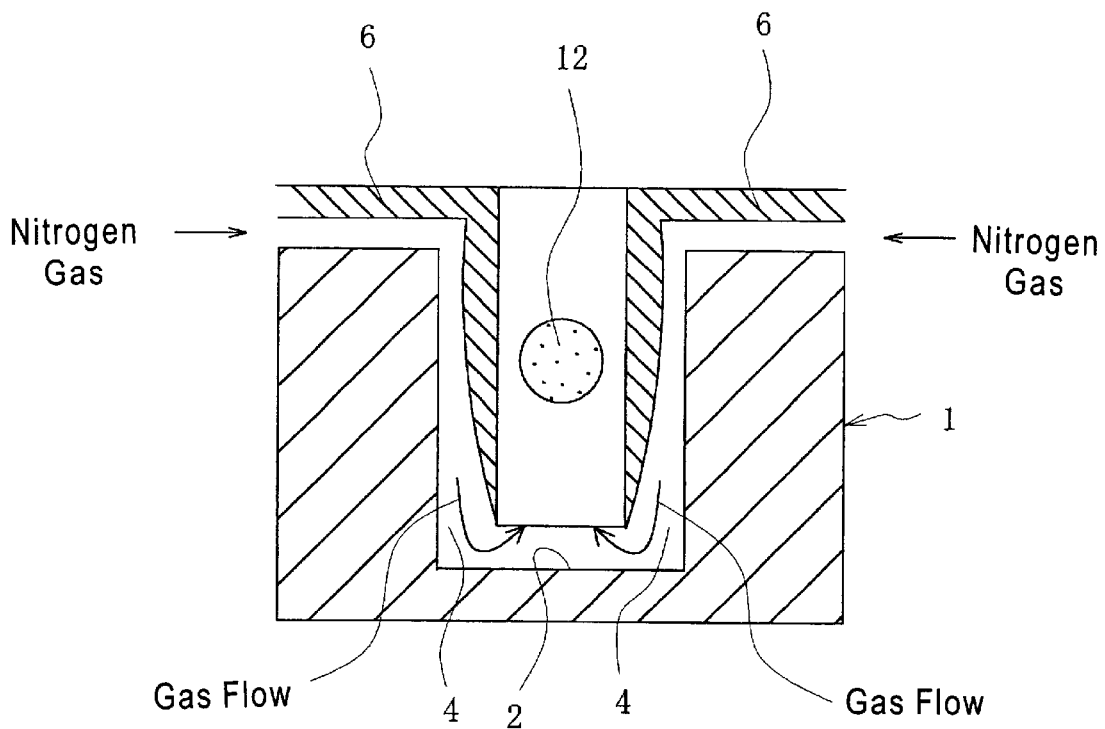
FIG. 7 is a schematic view of the device for floating or manufacturing a glass gob of the present invention.
Figure 8:
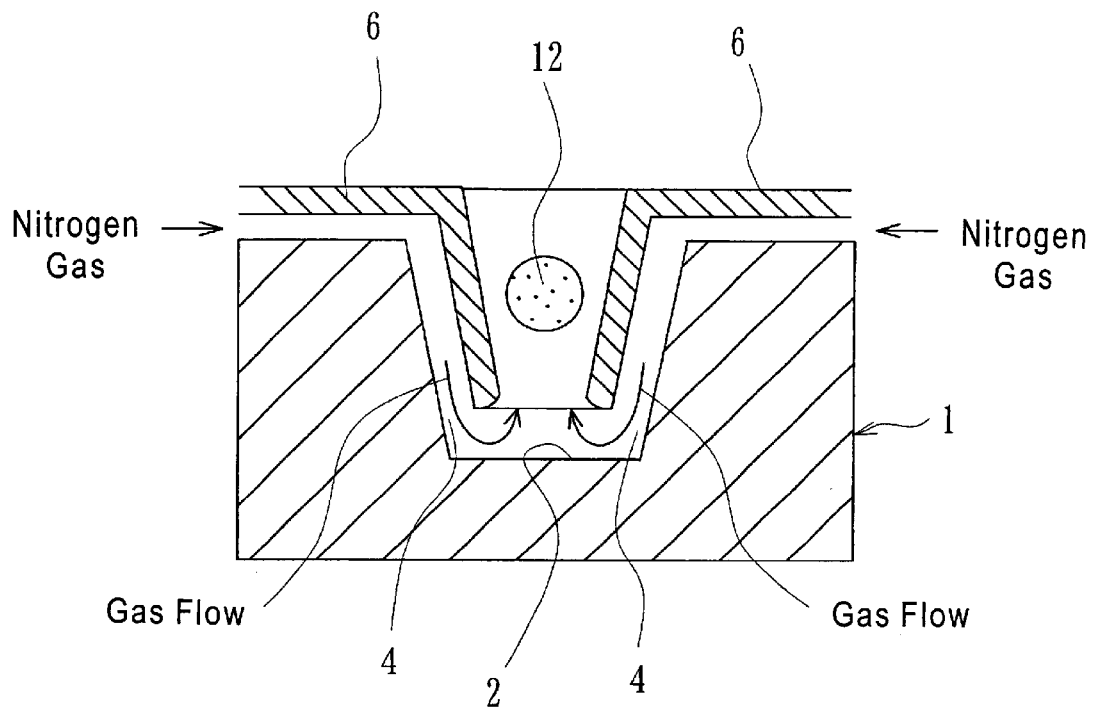
FIG. 8 is a schematic view of the device for floating or manufacturing a glass gob of the present invention.
Figure 9:
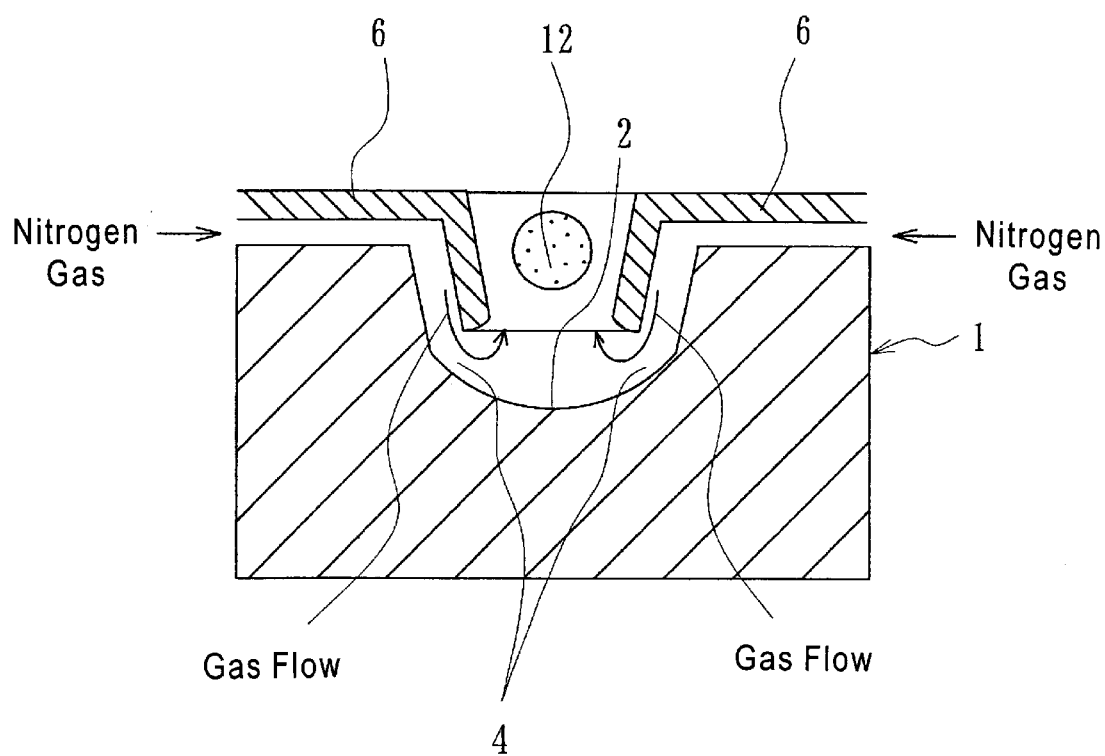
FIG. 9 is a schematic view of the device for floating or manufacturing a glass gob of the present invention.

Further, the position and sectional shape of the gas supply means in the form of slit-shaped injection inlet 4 and the sectional shape of the inner surface of the depression can be varied from what is shown in FIG. 4 in the manner of what is shown in FIGS. 6–9. FIGS. 6–10 are all sectional views of Floating Device 1 of the present invention. The sectional profile of inner surface 2 of the depression can be hemispherical as shown in FIGS. 4 and 6, cylindrical as shown in FIG. 7, and conical as shown in FIGS. 8 and 9. However, the apex of the cone (the bottom of the depression) shown in FIG. 8 is flat, while the apex of the cone (the bottom of the depression) shown in FIG. 9 is hemispherical. Further, although not shown, the shape of the bottom of the cylindrical depression shown in FIG. 7 may also be hemispherical.

Figure 10:
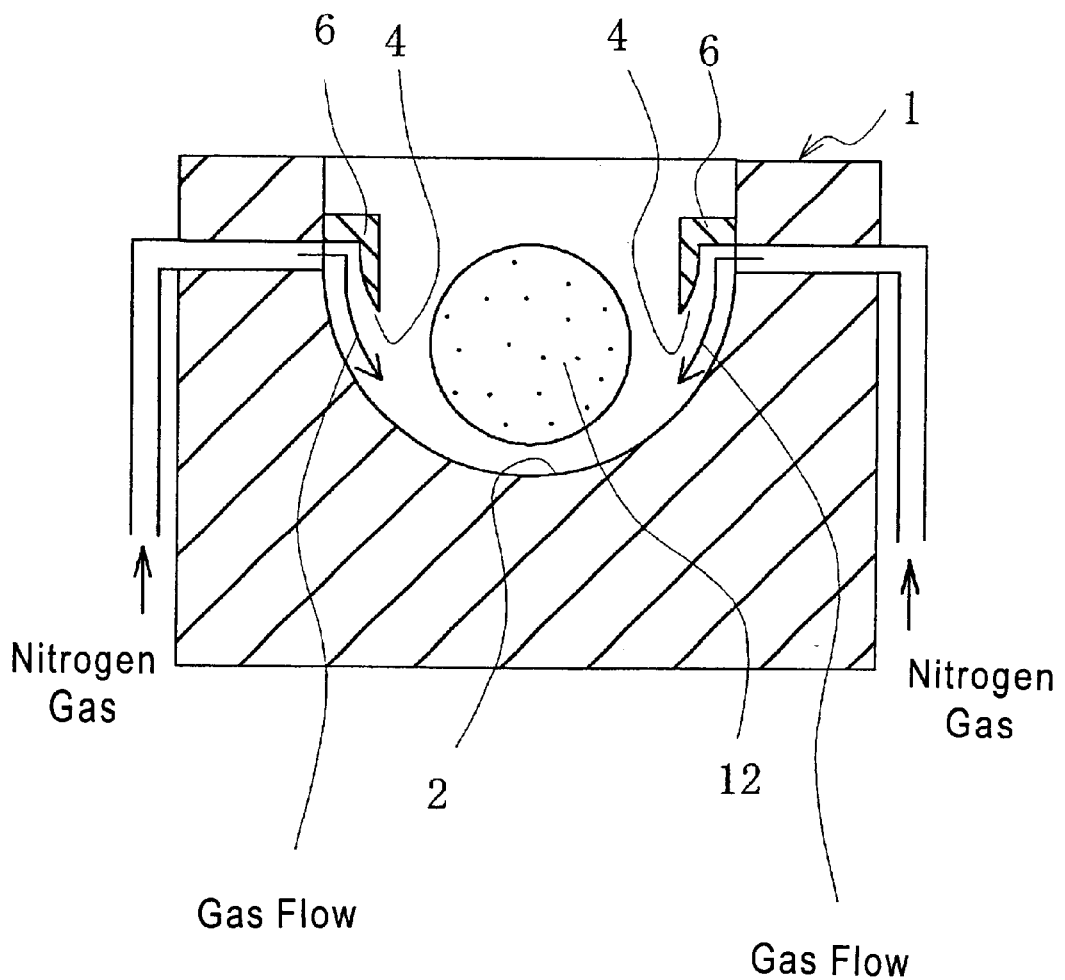
FIG. 10 is a schematic view of the device for floating or manufacturing a glass gob of the present invention.

As shown in FIGS. 1–3, gas flow supply inlets 3 may be positioned in proximity to the opening end, or as shown in FIG. 4, between the opening end and the bottom of the inner surface of the depression. Alternatively, as shown in FIGS. 6–9, gas flow supply inlets 4 may be positioned between the opening end and the bottom, or may be positioned close to the bottom of the depression. Still further, as shown in FIG. 10, a gas flow supply pipe supplying nitrogen gas, for example, can be passed between the opening end and the bottom of inner surface 2 of the depression and a member 6 directing the gas flow toward the bottom of the depression can be positioned on the depression inner surface 2 end of the supply pipe to form gas supply openings 4.

Further, the gas supply means and the depression are desirably secured after adjusting their relative positions. Change in their relative positioning makes it impossible to achieve a stable floating state. The member having the depression and the gas supply means may be mechanically integrated, or more preferably, formed as a single member. When manufacturing glass gobs by receiving molten glass in the depression, since molten glass flowing out of the nozzle is continuously received and formed, the forming mold is usually mounted on a movable table. However, since the mold depression and the gas supply means are integrated, there is no need to move the gas supply means to conform to movement of the mold.

To facilitate removal of glass gobs and device cleaning in the device for floating or manufacturing glass gobs of the present invention, the floating or manufacturing device may be divided into a number of units as needed. In that case, for example, a glass gob that is being held in a floating state can be removed from the bottom of the device by dividing the device and moving the glass gob to the molding device.

Further, in the method of the present invention, not only can equal quantities of gas be supplied through multiple gas flow supply inlets positioned on the perimeter of the depression and facing the center of the depression, but the gas supply level from multiple gas flow supply inlets may be varied in individual supply inlets to control the retention state, rotation state, and shape of the glass gob. Rotating the glass gob while floating and holding it in this manner permits the forming of spheres from molten glass gobs and softened glass gobs. The positioning of the gas supply may be adjusted and selected from among positions around the depression and positions at the bottom of the depression.

Disruption of the flow velocity balance leads to scattering of the molten glass to the exterior of the mold. However, suitable fine adjustment of the balance permits stable floating of the molten glass at any position. In particular, when the molten glass is small relative to the volume of the mold, it is possible to float the glass gob at a constant position in the mold and randomly rotate it. When the gas flow velocity is increased, the molten glass is made to turn. Accordingly, this turning motion (rotation) shapes the glass into a sphere. However, as the volume of molten glass increases, the molding of the spherical preform becomes technically more difficult. This is because the temperature differential between the interior and exterior of the molten glass being molded increases and because the lower portion of the molten glass is cooled by the floating gas during dripping and develops into a partially hardened portion. Accordingly, it is practical to reheat high-volume spherical preforms during molding. That is, reheating while floating can form spheres out of aspheric glass gobs. In methods of directly molding molten glass, when the gas flow rate is high, low viscosity tends to generate surface defects such as infolding in the glass surface. However, since reheating yields the optimum glass viscosity for molding, surface defects do not result. The viscosity of the glass during reheating preferably ranges from $10^2$ to $10^5$ poise. To avoid partial temperature drops due to the floating gas, the floating gas is desirably heated during the sphere formation process.

To manufacture a variety of lenses, is it desirable to inexpensively provide large spherical preforms. Conventionally, such preforms are manufactured by cold working, which is expensive. Since only large gob preforms with flattened upper surfaces can be obtained, they are not suited to the press molding of lenses with low curvatures. Accordingly, large spherical preforms are effective in the molding of such lenses. Even when preforms are dropped into lower molds with high curvatures to manufacture lenses, the spherical preforms naturally migrate to the center of the mold, which is undesirable. Further, since spherical preforms do not have a specific orientation, they afford the advantages of ease of handling during transfer and washing, while machines that employ them are simple in configuration.

Figure 5B:
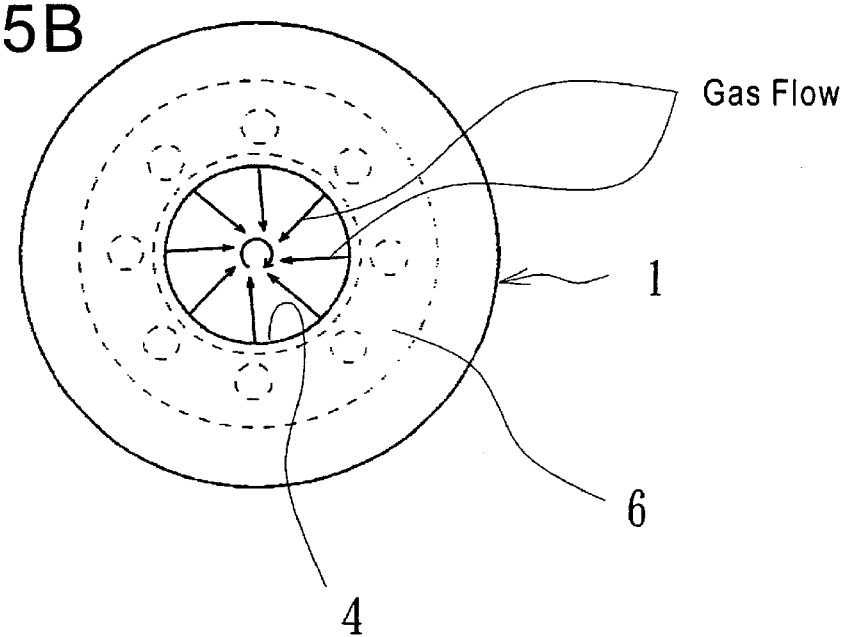

The direction in which the gas is supplied need only be a direction producing a gas flow from the depression opening side toward the bottom of the depression on the inner surface of the depression. Although there is not necessarily a requirement that gas be supplied directly downward toward the center of the bottom of the depression, the supplying of [gas] so that a collision of gas flows is effectively produced at the bottom of the depression is desirable from the perspectives of stability and maintenance. The collision of gas flows does not necessarily take place at the center of the bottom of the depression, but can be adjusted in consideration of the stability and rotational status of floating of the glass gob. As shown in FIG. 5(b), a gas supply direction may be selected to create a cyclone-like vortex at the bottom of the depression. Since a stable floating state is achieved and the glass gob is rotated, such a configuration is useful in the manufacturing of spherical glass gobs.

The gas that is fed into the depression may be uniformly fed from the perimeter of the depression or the balance of the gas flows that are supplied may be disrupted. Adjusting the balance of the gas flows permits the stable rotation of large glass gobs. For example, this can be conducted by varying the quantity of gas employed to generate gas flows that are supplied at positions along the perimeter of the depression, or a gas may be supplied to generate a gas flow from only a portion of the perimeter of the depression. For example, gas can be injected from continuous portions amounting to about 20 to 40 percent of the perimeter of the depression and almost no gas flow or absolutely no gas flow injected from the remaining portions. As shown in FIG. 4, for example, when split-shaped gas injection inlets 4 are provided completely around the perimeter of the depression, a plate-shaped member can be inserted in a portion of the gas passage between plate-shaped member 6 of stainless steel or the like and the member having the depression to block the passage of gas through that portion, and gas can be injected through only a portion of the perimeter of the depression.

Alternatively, as shown in FIG. 12, a ring-shaped plate member 15 with a cutaway portion can be inserted between member 6 and the perimeter of the depression of the member having a depression and gas flows injected only through the portion of the perimeter of the depression corresponding to the cutaway portion of the ring. At that time, the glass gob in the depression floats stably at a position somewhat closer to portion A in the figure and the gas flow from B toward A along the inner surface of the mold is submerged beneath the lower portion of the glass gob, imparting stable rotation. Such a configuration is useful when forming large glass [gobs] into spheres. In that case, collision between gas flows tends not to occur more than when gas is uniformly injected from the perimeter, but since gas flows between the mold and the glass gob, a state of non-contact is maintained with the mold. Further, on the A side at which no gas is injected, gas flowing from B to A as shown in the figure passes over the inner surface of the mold, along the inner perimeter of the slit portion formed in the gas flow supply inlets, and escapes out the top. Thus, there is a gas flow layer between the mold and the glass gob in this portion as well, and even though the glass gob crowds somewhat to the A side, the mold and the glass gob are prevented from contacting in this portion as well. When gas is supplied only from a portion of the rim of the opening of the depression, the position of the rim of the opening of the depression at which gas is supplied during floating may be varied as needed.

The shape of the depression in the device for floating or manufacturing glass gobs of the present invention can be suitably selected based on the shape of the [initial] glass gob, the shape of the glass gob being manufactured, and the like.

For example, as set forth above, the depression may be hemispherical as shown in FIGS. 4 and 6, cylindrical as shown in FIG. 7, and conical as shown in FIGS. 8 and 9. However the cone shown in FIG. 8 has a flat top (the bottom of the depression) and the cone shown in FIG. 9 has a hemispherical top (the bottom of the depression). Further, although not shown, the shape of the bottom of the conical depression shown in FIG. 7 may also be hemispherical. However, although the shape of the depression may be any shape that permits floating and holding of a glass gob in the depression, shapes that are structurally similar to glass gobs are preferred from the perspective of stable floating and rotation of glass gobs.

The device for floating or manufacturing glass gobs of the present invention can be employed in the manufacturing, molding, processing, and transferring of a glass gob while it is being floated.

The device for floating or manufacturing glass gobs of the present invention can be of a simple structure even without fine holes in the inner surface of the depression. Thus, it is inexpensive to manufacture, easy to clean, and does not require attention to clogging or crushing. Further, high pressure is not required to float the glass gob or the like. Further, since the glass gob is maintained in a good state of non-contact, damage due to contact with the glass gob does not occur. Accordingly, the use of the device for floating or manufacturing glass gobs of the present invention permits the stable maintenance of the device at low cost for an extended service life.

Further, pores may be provided in the depression of the device for floating or manufacturing glass gobs of the present invention in order to inject a gas flow. In that case, both the gas flow from the gas supply openings and the gas flow from the pores employed for injecting gas that are provided in the depression may be employed to float the glass gob. Combining the gas flow from the gas supply openings permits a reduction in the amount of gas and the number of pores used to inject a gas flow that are provided in the depression, and avoids the problems resulting when employing only the gas flow from the pores used for injection of a gas flow that are provided in the depression, such as pitting of the glass gob surface.

Further, all or part of the depression may be comprised of a porous material in the device for floating or manufacturing glass gobs of the present invention. In addition to injecting gas through the porous material, gas may be supplied toward the bottom along the inner surface of the depression from all or a portion of the area of the perimeter of the opening of the depression. Further, pores may be provided on the inner surface of the depression and gas injected through the pores toward the depression opening side may be used in combination. Thus, large glass gobs may be stably floated and molded by rotation.

There need not be pores in the depression in the device for floating or manufacturing glass gobs of the present invention. Thus, the floating or manufacturing device may be directly employed as a forming mold in press molding. For example, a floating or manufacturing device holding a glass gob in the depression may be employed as the lower mold and the glass gob may be pressed by an upper mold equipped with a forming surface of prescribed shape to manufacture glass gobs of prescribed shape. Further, molten glass may be received by the floating or manufacturing device of the present invention, cooled by the upper mold to a temperature permitting press molding, and then pressed by an upper mold equipped with a forming surface of prescribed shape.

That is, the present invention covers a method of manufacturing molded glass in which the floating or manufacturing device of the present invention is employed as a lower mold having a forming surface (this forming surface corresponding to the depression for holding a glass gob), and an upper mold having a forming surface at a position opposite the forming surface of the lower mold is employed to press mold softened glass gobs. This method comprises a step of adjusting a glass gob to a temperature suited to press molding while floating the glass gob with a gas flow, and a step of press molding the glass gob. The temperature suited to press molding can be suitably determined in consideration of the type of glass, size of the glass gob, pressure employed, and the like. Further, the press molding conditions may be suitably determined. Further, the molding press, including the upper mold and lower mold, and the materials employed in them may be identical to those in known devices.

The glass gob obtained from molten glass by the method of the present invention may be employed as a preform for press molding. Commonly employed methods may be employed in the press molding. For example, the glass gob manufactured by the method of the present invention is transferred to a press molding device. The press molding device may comprise an upper mold and a lower mold having at opposite positions forming surfaces corresponding to the shape of the molded glass to be manufactured. The glass gob is normally transferred to the lower mold, heated to a temperature at which the viscosity of the glass gob reaches about $10^6$–$10^{10}$ poise, preferably about $10^8$ poise, and pressed between the upper mold and lower mold to mold it to a desired shape. The cooled molded glass is then washed and annealed, yielding a glass product. It is also possible to press mold the glass gob in a lower viscosity range.

EMBODIMENTS

Embodiments of the present invention are described below with the figures.

Embodiment 1

FIG. 1 is a drawing of the area of a noble metal outflow nozzle 10 the upper end of which is mounted on a molten glass vessel. Outflow nozzle 10 is heated by a heater, not shown, and regulated by a temperature control device and a thermocouple welded to the nozzle to a temperature within a temperature range (at which the glass viscosity is 3–50 poise) permitting the outflow of the glass. Once the outflowing molten glass 11 has been received for a certain period by a depression in the mold, described further below, the mold is lowered to sever the flow of glass and the mold and molded glass are withdrawn from the glass outflow position. Simultaneously with withdrawing of the mold, another mold is positioned at the glass outflow position and the above-described forming operation is repeated. To prevent cracking of the molded glass due to a sharp temperature drop, the forming mold is preheated to a temperature close to the glass transition temperature with a heater and the glass is slowly cooled following molding.

Forming mold 1 will be described in detail below using FIG. 2. Heat-resistant stainless steel was mechanically machined to a cylindrical shape 40 mm in diameter and 40 mm in length. A depression 7 mm in depth and 4 mm in [arc] was machined into the upper end thereof. The inner surface of depression 2 was mirror finished and coated with 8 $\mu$m of gold to inhibit oxidation. The gas injection nozzle 3 will be described next. The front end of a copper pipe measuring 0.3 mm in pipe thickness and having an outer diameter of 2 mm was pinched to form an injection nozzle 3 mm in width having a 200 $\mu$m slit-shaped injection inlet. Eight of these injection nozzles were evenly disposed on the outer perimeter of the depression, the front ends of the nozzles were bent downward, and the nozzles were adjusted and secured so that the injected gas flowed in layer-like fashion downward along the inner surface of the depression. An inert gas such as nitrogen was injected through the nozzles to completely float the glass. Although the flow rate required for complete floating varied with the weight of the molten glass, complete floating was achieved when a total of 7.5 liters or more was injected each minute for about 1 gram of glass. When the flow rate balance prevents a stable floating state, it suffices to minutely adjust the gas flow rate of each nozzle.

Embodiment 2

In the same manner as in Embodiment 1, the method of molding molten glass will be described with FIG. 3, which differs from Embodiment 1 only in the configuration of the mold. A single-level low flat surface portion 30 mm in diameter and 300 $\mu$m in depth was machined into the upper surface of a stainless steel mold 1 identical to that in Embodiment 1. Eight evenly spaced holes 5 with a diameter of 3 mm were formed in the single-level low portion. Next, a stainless steel plate 6 was machined with an external diameter of 40 mm and a thickness of about 1 mm, a hole slightly smaller than the depression in the mold in its center portion, and a flange around the hole protruding 1 mm downward at an angle. The center of the hole in stainless steel plate 6 and the center of the depression in the forming mold were aligned, and the two were integrated as shown in the figure. Once integrated, gas flowing out of holes 5 that were 3 mm in diameter generated a layer-like gas flow from the top of the depression in the mold toward the center of the bottom portion. That is, end 4 of stainless steel plate 6 integrated with the top of the mold substantially functioned as a gas injection nozzle.

Embodiment 3

Basically identical in structure to Embodiment 2, this embodiment, differing only in the shape of the depression in the mold, will be described using FIG. 4. As shown in FIG. 4, the depression in the mold is 7.4 mm in depth, has a bottom in the form of a spherical surface with an [arc] of 4.4 mm. A trumpet-shaped opening extends from the bottom more than 2.5 mm upward. The angle of expansion is about 50°. The nozzle front end 4' of the plate-like upper surface of the mold protrudes 3 mm; the amount of protrusion is greater than in either Embodiment 1 or 2. Using this forming mold, a downward-directed nitrogen gas flow of 9.5 liters per minute was generated on the inner surface of the mold. A 980 mg molten glass gob 12 was dripped onto the center of the mold. As a result, molten glass gob 12 rotated while floating within the depression in the forming mold, yielding a roughly spherical glass gob. Generating a layer-like gas flow directed downward along the inner surface of the mold depression completely prevented contact between the mold and the glass while optimizing the shape of the mold depression and the positioning of nozzle front ends 4 permitted rotation of the molten glass and the molding of spherical glass.

Embodiment 4

A forming mold identical to that of Embodiment 2 was [preheated] with a heater to 400° C. and nitrogen gas heated to 720° C. was injected at a rate of 13 liters per minute. The glass gob manufactured in Embodiment 1 was then placed in the depression of the mold. The glass gob was randomly rotated while being maintained in a floating state, forming a sphere in about 6 minutes. The glass gob was floated and cooled while lower the temperature of the nitrogen gas, yielding a solidified glass sphere.

Embodiment 5

A stainless steel disk equipped with a screw hole and measuring 12 mm in diameter and 5 mm in thickness was prepared and one side was finished by polishing. The polished surface was coated with 8 $\mu$m of gold and fastened by screw to a shaft for pressing as a flat-surface mold for pressing glass gobs. The pressing-use flat-surface mold was mounted on the air cylinder member of a floating mold device and adjusted to permit the application of pressure to glass gobs. Next, a glass gob was formed by the method of Embodiment 1. When the glass gob reached a temperature of 580° C., the glass gob was subjected to 20 seconds of pressure by the flat-surface mold at 430° C. The pressed product was removed from the flat-surface mold and cooled to room temperature. The pressed product had a spherical surface on one side with an [arc] of about 4 mm; the other side was molded flat.

Embodiment 6

FIG. 11 is a drawing descriptive of an embodiment in which molten glass 23 is received by a glass receiving member 22 on the outer perimeter of the upper surface of the mold and a glass sphere is formed. The method of manufacturing the forming mold will be described below with the figure.

As shown in the figure, heat-resistant stainless steel was mechanically machined to a cylindrical shape 40 mm in diameter and 40 mm in length, and a depression with a depth of 7.9 mm, an [arc] on the bottom of 4.8 mm, and a slope expansion angle of 80° was machined into the top of the cylinder. The inner surface of the depression was mirror finished and plated with 10 $\mu$m of Ni to prevent oxidation. The outer perimeter of the depression was ground 0.5 mm lower than the outermost perimeter and eight holes 1.5 mm in diameter were formed from the bottom of the cylinder up through to the somewhat lower portion. A gas injecting nozzle was machined from heat-resistant stainless steel 40 mm in diameter, 3.5 mm in thickness, and protruding 4.8 mm downward. As shown in the figure, the taper of the protruding member in this nozzle was identical to the taper of the depression so that they would fit together. A through-hole with an opening angle of 15° was formed in the center and an angular portion with an [arc] of 6 mm was formed in the upper surface of the hole. As shown in the figure, the cross-section of the lower front end of the gas injecting nozzle was machined to the shape of a blade. In the same manner as in the above-described cylindrical product, the upper surface and inner surface of the gas injecting nozzle were mirror finished and plated with 10 $\mu$m of Ni to prevent oxidation.

Figure 11A:
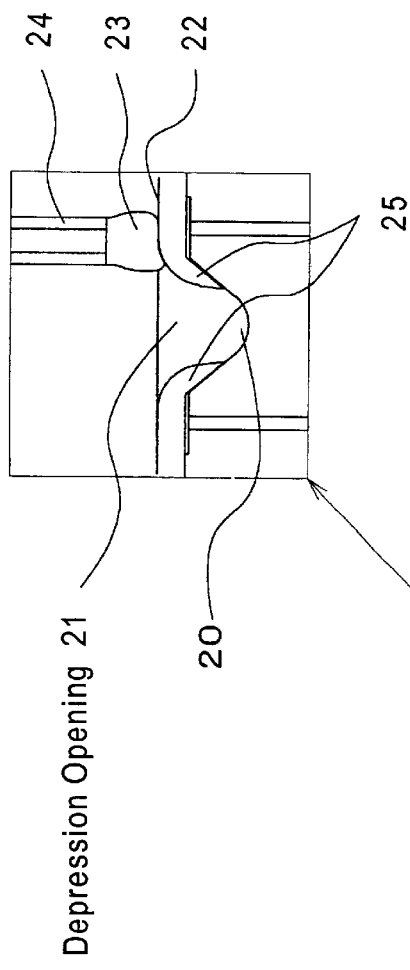
FIG. 11 is a schematic view of the device for floating or manufacturing a glass gob of the present invention.

The above-described two parts were combined and assembled into a glass sphere forming mold as described below. As indicated in FIG. 11(a) and the enlarged view thereof (top), the two were positioned together somewhat off-center and secured together with screws. In the enlarged view, the gap in the gas injecting nozzle was 100 $\mu$m on the right and less than 10 $\mu$m on the left. Unbalancing the gap in the gas injecting nozzle in this manner generates a large difference in the magnitude of the flow rate of gas injected through the nozzle and produces a unidirectional gas flow that efficiently rotates molten glass. That is, for the molding of spheres, a nearly unidirectional gas flow is desirable because of the high capacity to rotate the molten glass. When the gas flow is unbalanced, the molded article tends to fly out of the indentation. However, it is possible to prevent the molded article from flying out even when there is absolutely no opposing gas flow by making the gap in the gas injecting nozzle less than 200 $\mu$m and reducing the injected gas flow rate. The glass sphere molding operation will be described next.

Figure 11B:
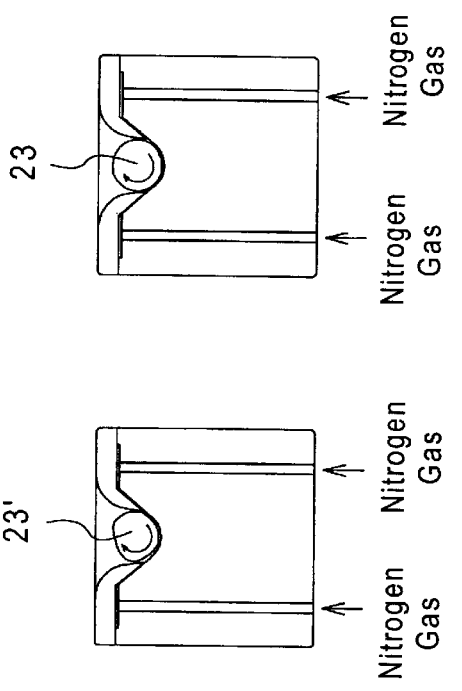

One of a number of sphere forming molds set on the outer perimeter of a turntable was positioned under a platinum alloy outflow nozzle out of which glass flowed and molten glass was received by the outer perimeter of the depression in the upper surface of the mold. When a certain weight of the molten glass had accumulated, the forming mold was lowered as shown in FIG. 11(b) to make the molten glass 23 drop into the depression. At that time, the center of the platinum alloy nozzle 24 was desirably positioned in the vicinity of the boundary between the flat portion and the arc portion of the upper surface of the mold. When positioned in this manner, lowering the mold made the molten glass drop smoothly into depression 20 of the mold. After dropping into the mold, the turntable was quickly rotated to withdraw the forming mold from the nozzle position and move another forming mold beneath the nozzle. Sphere formation was continuously conducted.

Figure 11C:
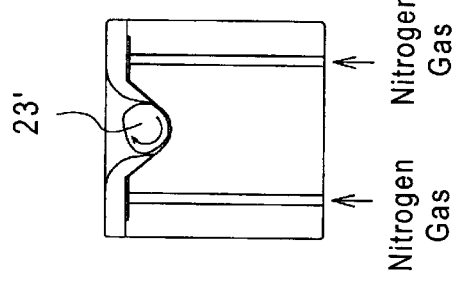
Figure 11D:
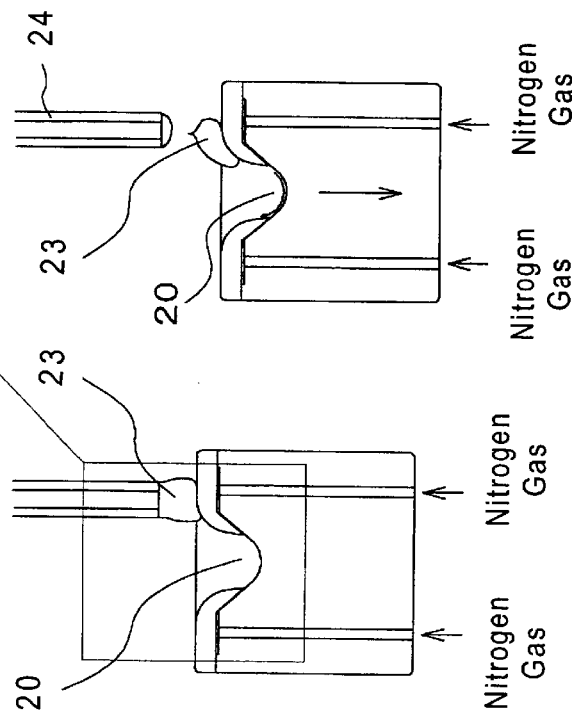

As shown in FIG. 11(b), a unidirectional layer-like gas flow was generated on the bottom surface of the mold. The molten glass 23 that had been dropped in rode the gas flow and was rapidly rotated. The maximum injection flow rate varies with the size of the gap in the injection nozzle, but at a gap of 80–100 $\mu$m, spheres can be formed at a flow rate of as low as 0.8–2.0 L/min. As shown in FIG. 11(c), molten glass 23' was malformed just after dropping in, but rapid rotation while changing the direction of the glass yielded a glass sphere 23 with an extremely good degree of sphericity. Since the lower surface arc (radius of curvature) of the forming mold was 4.8 mm, it was possible to mold spheres up to 9.3 mm in diameter. At that time, the difference in diameter of the spheres was 100 $\mu$m or less, which was an adequate sphericity for preforms for molded glass lenses. Two thousand glass spheres were consecutively molded and the variation in weight was examined, revealing the range to be ±10 mg for a target weight of 1,250 mg.

Based on the method of floating glass gobs, method of manufacturing glass gobs or spherical glass gobs, and method of manufacturing molded glass of the present invention, since a glass gob or the like is maintained in a stable floating state and a high degree of floating can be achieved, the glass gob can be maintained in a state of complete non-contact with the inner surface of the depression. Thus, good quality glass gobs can be readily manufactured from even the glass materials with a strong tendency to crystallize and the glass materials with components volatizing in large amounts in the outflow temperature range that are difficult process with prior art.

Further, based on the method of manufacturing glass gobs of the present invention, since the gas does not have to be injected directly onto the glass gob, indentations and pitting are not generated on the glass gob and glass gobs with good surface characteristics can be manufactured.

Further, the device for floating or manufacturing glass gobs of the present invention is of a simple structure in which pores do not have to be present on the inner surface of the indentation. Thus, the device is inexpensively manufactured, easy to clean, and does not require attention to clogging or crushing. Further, since glass gobs are maintained in a good state of non-contact even without the use of elevated pressure, damage does not result from contact between the glass gobs and the depression. The use of the floating or manufacturing device of the present invention to manufacture glass gobs permits inexpensive manufacturing of glass gobs and affords a long device service life.

Further, since the device for floating or manufacturing glass gobs of the present invention need not have pores in the inner surface of the depression, it can be directly employed as a press forming mold and the step of manufacturing glass gobs or the like can be simplified.

What is claimed is:

1. A method of floating a glass gob by means of a gas flow employing a device having a depression for floating and holding said glass gob in said depression,
wherein said gas flow runs along part or all of the inner surface of said depression from an opening side toward the bottom of said depression.

2. The method of claim 1 wherein said gas flow issues from a gas flow supply inlet positioned at the opening end of said depression or on the inner surface between said opening end and said bottom.

3. The method of claim 1 wherein said glass gob is a molten glass gob or a softened glass gob.

4. A method of manufacturing a glass gob employing a device comprising a depression for holding a molten glass gob by floating and cooling said molten glass gob while floating said molten glass gob by means of a gas flow in said depression, wherein said gas flow runs along part or all of the inner surface of said depression from an opening side of said depression toward the bottom of said depression.

5. The method of claim 4 wherein said molten glass gob is formed while floating molten glass flowing out of a molten glass outflow nozzle by means of said gas flow on said depression.

6. The manufacturing method of claim 4 wherein molten glass flowing out of a molten glass outflow nozzle is received by a glass receiving member provided on the outer portion of said depression, said molten glass received on said glass receiving member is severed from said outflow nozzle to form a molten glass gob, and said molten glass gob is guided into said depression.

7. The manufacturing method of claim 6 wherein said glass receiving member is provided adjacent to the opening of said depression on said device having a depression.

8. The manufacturing method of claim 6 wherein the severing of said molten glass from said outflow nozzle is accomplished by moving said glass receiving member downward or by moving said molten glass outflow nozzle upward.

9. The manufacturing method of claim 4 wherein said molten glass gob is formed into a sphere while being floated.

10. A method of manufacturing spherical glass gobs employing a device comprising a depression for floating and holding a glass gob in said depression to render spherical by a gas flow while floating a glass gob that has been softened, characterized in that said gas flow runs along part or all of the inner surface of said depression from the opening side of said depression toward the bottom of said depression.

11. A method of manufacturing molded glass characterized in that a glass gob obtained by the method of claim 4 is press molded using an upper mold and a lower mold having opposing forming surfaces.

12. The manufacturing method of claim 11 wherein a glass gob having a viscosity of $10^2$–$10^{10}$ poise is press molded.

13. A method of manufacturing molded glass characterized in that a glass gob obtained by the method of claim 10 is press molded using an upper mold and a lower mold having opposing forming surfaces.

14. The manufacturing method of claim 13 wherein a glass gob having a viscosity of $10^2$–$10^{10}$ poise is press molded.

15. A method of manufacturing molded glass by press molding a softened glass gob with an upper mold and a lower mold having opposing forming surfaces, comprising a step of adjusting a glass gob to a temperature suited to press molding while floating said glass gob in a depression-shaped forming surface by means of a gas flow running along part or all of the depression-shaped forming surface of said lower mold from the opening side of said lower mold toward the bottom of said lower mold; and a step of press forming said glass gob.

16. The manufacturing method of claim 15 wherein a glass gob having a viscosity of $10^2$–$10^{10}$ poise is press molded.

17. The manufacturing method of claim 4 wherein said gas flow is supplied through a gas flow supply inlet provided on the opening end of said lower mold or on the inner surface between said opening end and the bottom.

18. The manufacturing method of claim 10 wherein said gas flow is supplied through a gas flow supply inlet provided on the opening end of said lower mold or on the inner surface between said opening end and the bottom.

19. The manufacturing method of claim 11 wherein said gas flow is supplied through a gas flow supply inlet provided on the opening end of said lower mold or on the inner surface between said opening end and the bottom.

20. The manufacturing method of claim 13 wherein said gas flow is supplied through a gas flow supply inlet provided on the opening end of said lower mold or on the inner surface between said opening end and the bottom.

21. The manufacturing method of claim 15 wherein said gas flow is supplied through a gas flow supply inlet provided on the opening end of said lower mold or on the inner surface between said opening end and the bottom.

22. The manufacturing method of claim 4 wherein the liquidus temperature of the glass comprising said glass gob is 900° C. or greater.

23. The manufacturing method of claim 10 wherein the liquidus temperature of the glass comprising said glass gob is 900° C. or greater.

24. The manufacturing method of claim 11 wherein the liquidus temperature of the glass comprising said glass gob is 900° C. or greater.

25. The manufacturing method of claim 13 wherein the liquidus temperature of the glass comprising said glass gob is 900° C. or greater.

26. The manufacturing method of claim 15 wherein the liquidus temperature of the glass comprising said glass gob is 900° C. or greater.

27. A device for floating and manufacturing a glass gob comprising a depression for floating and holding a glass gob in said depression through the action of a gas flow, and a gas flow supply inlet for generating a gas flow for floating a glass gob, the gas flow running along part or all of the inner surface of said depression from an opening side of said depression to the bottom.

28. The device of claim 27 wherein said gas flow supply inlet is provided on the opening end of said depression or on the inner surface between said opening end and the bottom.

29. The device of claim 27 wherein said glass gob is a molten glass gob or softened glass.

30. A glass gob manufacturing device comprising a depression for floating and holding a molten glass gob in said depression through the action of a gas flow; a gas flow supply inlet for generating a gas flow for floating a glass gob, the gas flow running along part or all of the inner surface of said depression from an opening side of said depression to the bottom; and a glass receiving member upon which molten glass from a molten glass outflow nozzle is mounted as the molten glass gob, for introducing said molten glass into said depression, positioned adjacent to said opening of said depression.

31. The device of claim 30 wherein said gas flow supply inlet is provided on the opening end of said depression or on the inner surface between said opening end and the bottom.

32. The device of claim 27 wherein said inner surface of said depression is the forming surface of a press forming mold.

33. The device of claim 30 wherein the inner surface of said depression is the forming surface of a press forming mold.

34. The method according to claim 1, wherein said depression includes a gas supply means for forming a gas flow supply inlet in proximity to the bottom of the depression and floating and holding said glass gob inside thereof.

35. The method according to claim 4, wherein said depression includes a gas supply means for forming a gas flow supply inlet in proximity to the bottom of the depression and floating and holding said glass gob inside thereof.

36. The method according to claim 10, wherein depression includes a gas supply means for forming a gas flow supply inlet in proximity to the bottom of the depression and floating and holding said glass gob inside thereof.

37. The method according to claim 15, wherein said depression includes a gas supply means for forming a gas flow supply inlet in proximity to the bottom of the depression and floating and holding said glass gob inside thereof.

38. The device according to claim 27, wherein said depression includes a gas supply means for forming a gas flow supply inlet in proximity to the bottom of the depression and floating and holding said glass gob inside thereof.

39. The device according to claim 30, wherein said depression includes a gas flow supply inlet in proximity to the bottom of the depression and floating and holding said glass gob inside thereof.

* * * * *